(12) United States Patent
Gilmer et al.

(10) Patent No.: US 6,564,150 B2
(45) Date of Patent: May 13, 2003

(54) SYSTEM AND METHOD FOR ORIENTING SEISMIC ENERGY RECEIVERS TO YIELD DISCRIMINATED VERTICAL SHEAR WAVES

(75) Inventors: Allen L. Gilmer, Austin, TX (US); Bob A. Hardage, Austin, TX (US); James L. Simmons, Jr., Austin, TX (US)

(73) Assignees: Board of Regents for the University of Texas, Austin, TX (US); Vecta Technologies, LP, Dallas, TX (US)

( * ) Notice: Subject to any disclaimer, the term of this patent is extended or adjusted under 35 U.S.C. 154(b) by 0 days.

(21) Appl. No.: 09/788,840

(22) Filed: Feb. 20, 2001

(65) Prior Publication Data

US 2001/0004727 A1 Jun. 21, 2001

Related U.S. Application Data

(63) Continuation-in-part of application No. 09/436,453, filed on Nov. 8, 1999.

(51) Int. Cl.[7] .................................................. G01V 1/28
(52) U.S. Cl. ............................. 702/14; 367/56; 367/58
(58) Field of Search ............................. 702/14; 367/56, 367/57, 58

(56) References Cited

U.S. PATENT DOCUMENTS

| | | | | |
|---|---|---|---|---|
| 4,803,666 A | * | 2/1989 | Alford | 367/75 |
| 5,136,544 A | * | 8/1992 | Thomsen et al. | 367/31 |
| 5,136,554 A | * | 8/1992 | Thomsen et al. | 367/75 |
| 6,061,298 A | * | 5/2000 | Madtson et al. | 367/21 |
| 6,205,403 B1 | * | 3/2001 | Gaiser et al. | 702/14 |
| 6,292,754 B1 | * | 9/2001 | Thomsen | 702/14 |

OTHER PUBLICATIONS

The Leading Edge—Special Section—Instrumented Oil Fields—"Shear Waves from 3–D–9–C Seismic Reflection Data—Have We Been Looking for Signal in all the Wrong Places?" by J. Simmons, and M. Backus; The Society of Exploration Geophysics; pp. 604–612; Jun. 2001.

Thesis by Bryan De Vault; Dec. 5, 2001; 110 pages.

* cited by examiner

*Primary Examiner*—Edward Lefkowitz
*Assistant Examiner*—Anthony Gutierrez
(74) *Attorney, Agent, or Firm*—Hitt Gaines & Boisbrun

(57) ABSTRACT

A system for, and method of, orienting seismic energy sources and seismic energy receivers to substantially separate a compressional wave from a vertical shear wave. The method includes reflecting a seismic energy from a subsurface interface to produce a reflected seismic energy wave that has a compressional energy and vertical shear energy associated therewith. A first seismic energy receiver is oriented such that it is aligned with an angle of emergence of the reflected seismic energy wave to thereby maximize the vertical shear energy received by a second seismic energy receiver.

25 Claims, 5 Drawing Sheets

SYSTEM AND METHOD FOR ORIENTING SEISMIC ENERGY RECEIVERS TO YIELD DISCRIMINATED VERTICAL SHEAR WAVES

CROSS-REFERENCE TO RELATED APPLICATION

This application is a continuation in part of U.S. patent application Ser. No. 09/436,453, filed on Nov. 8, 1999, entitled "METHOD OF SEISMIC EXPLORATION DISCRIMINATING HORIZONTAL AND VERTICAL SHEAR WAVES" to Milo Backus, et al., which is incorporated herein by reference.

TECHNICAL FIELD OF THE INVENTION

The present invention is directed, in general, to geophysical exploration and, more specifically, to a system and method for orienting seismic energy sources and receivers to yield discriminated compressional and vertical shear waves.

BACKGROUND OF THE INVENTION

Currently, most geophysical techniques dealing with multi-dimensional seismic data do not discriminate or locate seismic energies of different orientations, such as the compressional energy or vertical and horizontal shear energies of reflected seismic data systems. In a typical multi-dimensional seismic survey, a multi-mode seismic energy generator may be used to generate a preponderance of one orientation of seismic energy relative to a particular orientation. Then a preponderance of energies orthogonal to the first but relative to the same orientation may also be generated. However, the orientation of the received seismic energies changes at each receiver due to the fact that the orientation between the seismic energy source and each receiver in a multi-dimensional seismic array is different.

Differently oriented seismic energies travel differently through the subsurface strata based upon the characteristics of the subsurface strata. Thus, if a fault plane in the strata were in more of a vertical orientation relative to the plane defined by the seismic energy source-receiver line, the different seismic energies would have a different travel characteristic. The mapping of the subsurface features could be greatly enhanced through processing of the oriented seismic energies mentioned above. This is especially true in an orientation specific to the azimuths defined by each seismic energy receiver and source pair. Additionally, important rock property information can be ascertained by comparing differences and similarities of the attributes of the oriented seismic energies.

Compressional energy waves may generate vertical shear energy waves at subsurface interfaces. Additionally, vertical shear waves may split into two "daughter" shear waves in areas containing subsurface vertical fractures that complicate the problem of intermingling but offer opportunity for analysis if the energies could be discriminated. However, the processing of such data is complicated, because the oriented energies are intermingled and therefore not easily discriminated into the differently oriented energies for each receiver-source azimuth. Also, the processing of these components is further complicated since the orientation of the operational modes of the seismic energy source do not always correspond to the orientation of each and every receiver in the geophysical array.

Accordingly, what is needed in the art is a way to more effectively separate and discriminate between compressional and vertical shear energy orientations in seismic surveying situations.

SUMMARY OF THE INVENTION

To address the above-discussed deficiencies of the prior art, the present invention provides a system for, and method of, orienting seismic energy receivers to substantially separate a compressional wave from a vertical shear wave. In an advantageous embodiment, the method includes reflecting a seismic energy from a subsurface interface to produce a reflected seismic energy wave, such as one generated by an energy source, that has a compressional energy and vertical shear energy associated therewith. A first seismic energy receiver is oriented such that it is aligned with an angle of emergence of the reflected seismic energy wave to thereby maximize the vertical shear energy received by a second seismic energy receiver. The emergence angle may vary, for example, between 0° and 90°. As discussed below, the orientation of the first receiver may be either physical or its orientation may also be achieved by applying an algorithm to the data received by the first seismic energy receiver. In a preferred embodiment, the first and second seismic energy receiver are orthogonal with respect to each other.

In another embodiment, orienting the first and second seismic energy receivers includes orienting the first and second seismic energy receivers in a vertical plane containing the energy source and said first and second seismic energy receivers.

In another embodiment, the method includes applying an algorithm to data received by the first and second seismic energy receivers. In such embodiments, the algorithm may be used to convert data received from a radial coordinate to a compressional coordinate of the first seismic energy receiver and convert data received from a vertical coordinate to a vertical shear coordinate of the second seismic energy receiver. In an alternative embodiment, however, the step of orienting the first and second seismic energy receivers may include physically orienting the first seismic energy receiver with the emergence angle. It should be understood that orienting the first seismic energy receiver with the emergence angle will also change the orientation of the second seismic energy receiver with respect to the emergence angle.

In another aspect, the present invention also provides a system for separating a compressional seismic wave from a vertical shear seismic wave. In an exemplary embodiment, the system includes a reflected seismic energy wave reflected from a subsurface interface and that has compressional energy and vertical shear energy associated therewith and further includes first and second seismic energy receivers wherein the first seismic energy receiver is aligned with an angle of emergence of the reflected seismic energy wave to thereby maximize the vertical shear energy received by the second seismic energy receiver. In yet another aspect, the present invention provides a method of exploring a subterranean feature with seismic energy. In this embodiment, the method includes (1) generating a seismic energy wave toward a subterranean feature (2) reflecting the seismic energy from the subterranean feature to produce a reflected seismic energy wave having compressional energy and vertical shear energy associated therewith and (3) separating at least a portion of a compressional wave of the seismic energy wave from at least a portion of a vertical shear wave of the seismic energy wave, which further includes orienting first and second seismic energy receivers such that the first seismic energy receiver is aligned with an angle of emergence of the reflected seismic energy wave to thereby maximize the vertical shear energy received by the second seismic energy receiver.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
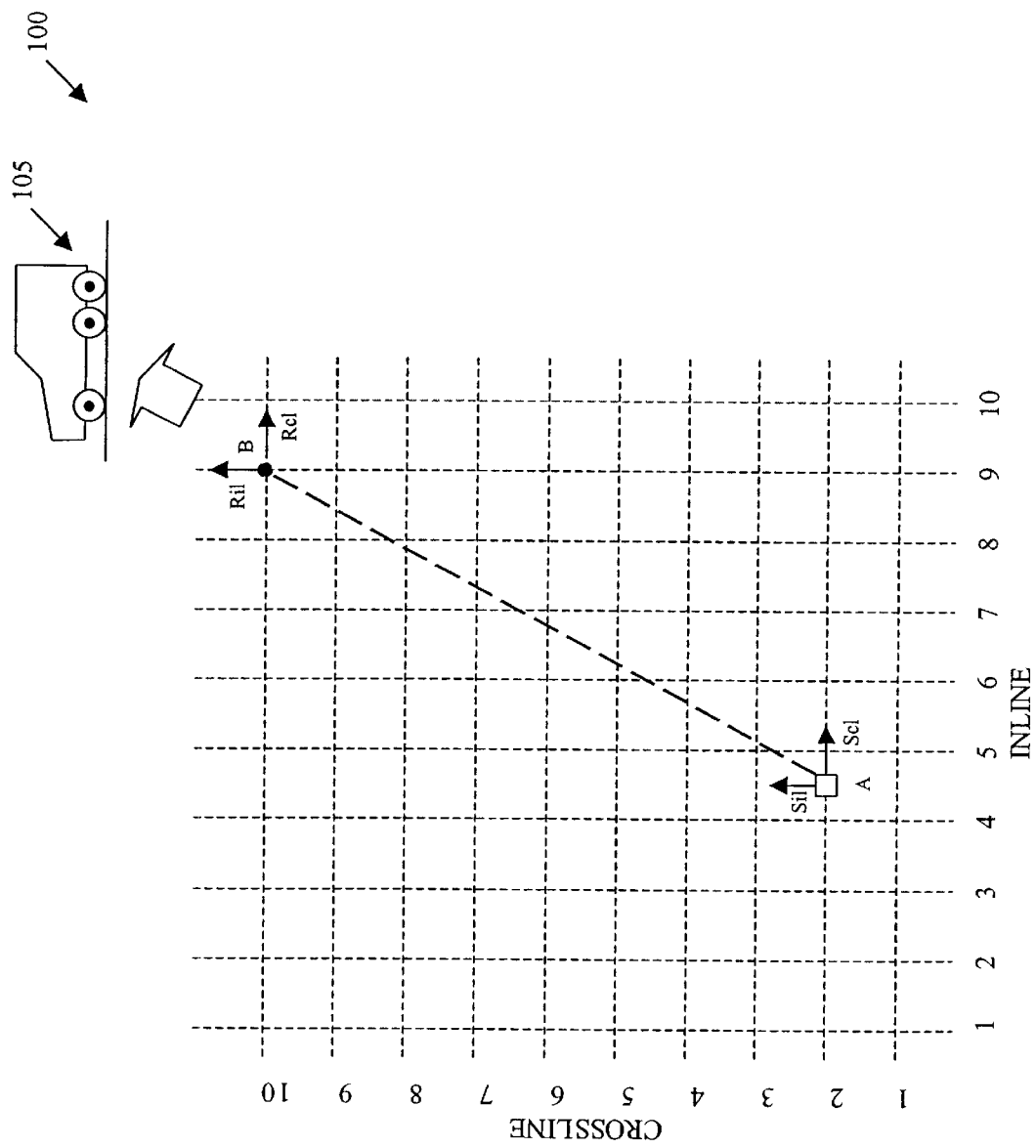
FIG. 1 illustrates a plan view of an embodiment of a volumetric or three dimensional (3-D) seismic survey system.

Referring initially to FIG. 1, illustrated is a plan view of an embodiment of a volumetric or three dimensional (3-D) seismic survey system 100. The seismic survey system 100 includes essentially orthogonal first and second seismic energy sources Sil, Scl located at a source station A and essentially orthogonal first and second seismic energy receivers Ril, Rcl located at a receiver station B. The seismic survey system 100 also includes a recording vehicle 105, which captures and records seismic data received by the first and second seismic energy receivers Ril, Rcl. As shown in FIG. 1, both source and receiver stations A, B are positioned with respect to essentially orthogonal inline and crossline locations collectively designated INLINE 1–10 and CROSSLINE 1–10. This orientation is commonly called field coordinate space.

In the illustrated embodiment, the source station A is located on a CROSSLINE 2 and positioned midway between an INLINE 4 and an INLINE 5. The receiver station B is located at the intersection of an INLINE 9 and a CROSSLINE 10. These are arbitrary locations and of course, receivers arrayed at more than one receiver station may be typically arrayed about the source station A to receive and record additional reflected seismic energy in a volumetric seismic survey. The first seismic energy source Sil is an inline-polarized horizontal source, and the second seismic energy source Scl is a crossline-polarized horizontal source. Similarly, the first seismic energy receiver Ril is an inline horizontal sensor, and the second seismic energy receiver Rcl is a crossline horizontal sensor. Although not specifically detailed in FIG. 1, source station A and receiver station B also include a vertical seismic energy source Sv and a vertical seismic energy receiver Rv, respectively.

In the seismic survey system 100, the seismic energy imparted at the source station A into the subsurface formations of the earth contains seismic energy modes of various orientations. Generally, these oriented seismic energies contain vertical shear waves, horizontal shear waves, and compression waves. In the field coordinate orientation of FIG. 1, the first and second seismic energy receivers Ril, Rcl receive energies from each of these three modes or orientations that are intermingled together in a way that complicates data processing and imaging.

Figure 2:
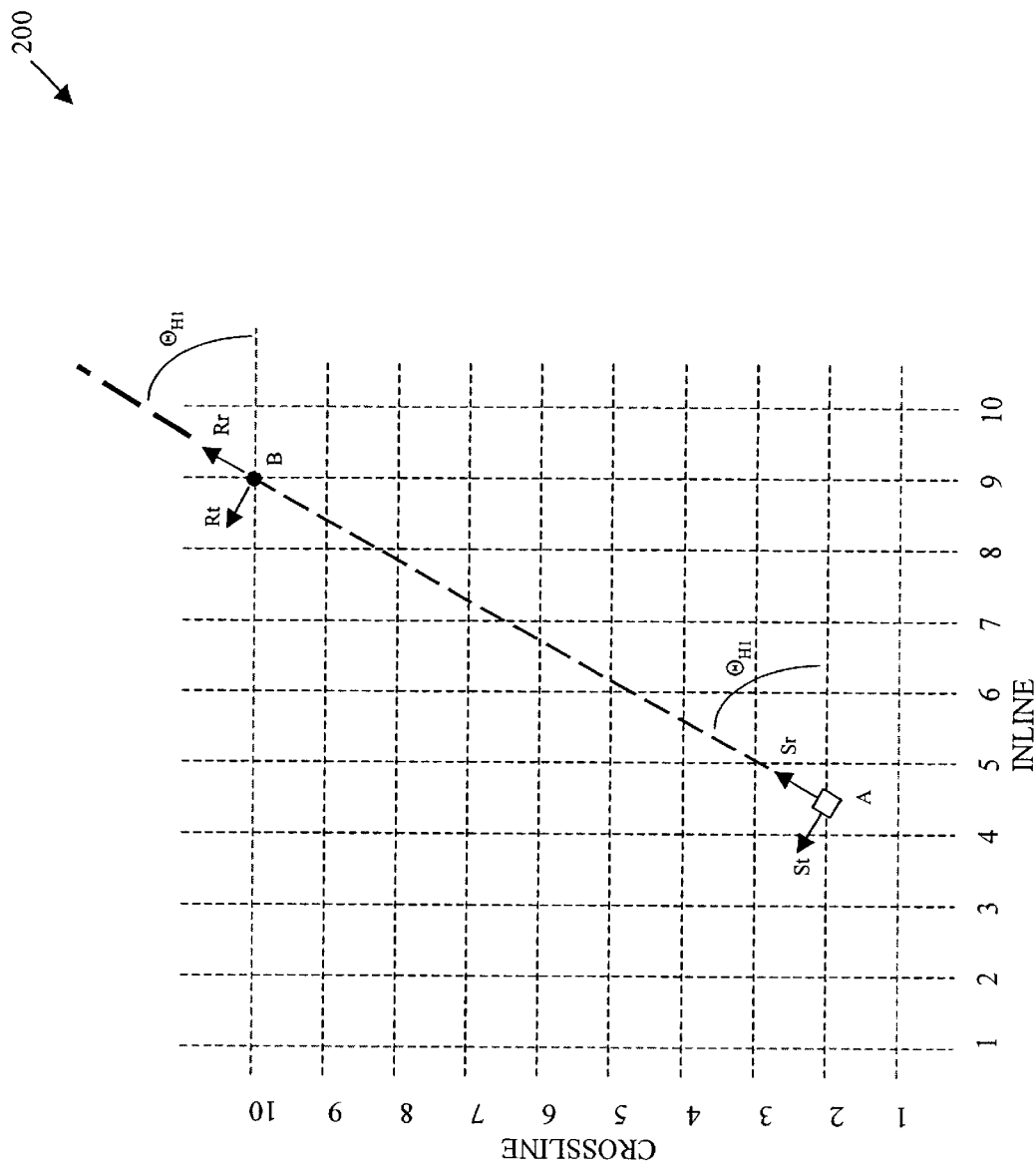
FIG. 2 illustrates a plan view of an embodiment of a seismic survey system showing a transformation in the horizontal plane of the seismic survey system of FIG. 1.

Turning now to FIG. 2, illustrated is a plan view of an embodiment of a seismic survey system 200 showing a transformation in the horizontal plane of the seismic survey system 100 of FIG. 1. The seismic survey system 200 includes essentially orthogonal first and second seismic energy sources Sr, St located at a source station A and essentially orthogonal first and second seismic energy receivers Rr, Rt located at a receiver station B. As shown in FIG. 2, both source and receiver stations A, B are still positioned with respect to essentially orthogonal inline and crossline locations collectively designated INLINE 1–10 and CROSSLINE 1–10, as before. However, the seismic survey system 200 employs a coordinate rotation to transform the horizontal sources and receivers from the inline and crossline orientation (field coordinate space) of FIG. 1 to a radial and transverse coordinate orientation (radial/transverse space), as shown in FIG. 2.

This coordinate change is a simple trigonometric rotation of both the sources and receivers as defined by an azimuth angle $\Theta_{H1}$. The azimuth angle $\Theta_{H1}$ is defined as the angle between the crossline direction and a straight line formed through the source-receiver station pair A-B, as shown in FIG. 2. This coordinate change is typically accomplished through manipulation and processing of the recorded seismic data. However, this coordinate change may also be accomplished by physically orienting the sources and receivers as shown in FIG. 2.

This rotation is critical for separating wave modes in a 3-D multi-component seismic data acquisition geometry. This coordinate rotation transforms the seismic data to allow the first receiver Rr and the first seismic energy source Sr, which are oriented in the radial direction, to effectively provide a wavefield that is dominated by compression and vertical shear modes. This arrangement minimizes interference from horizontal shear modes. Correspondingly, the rotation also transforms the seismic data to allow the second seismic energy receiver Rt and the second seismic energy source St, which are oriented in the transverse direction, to effectively provide a wavefield that is dominated by horizontal shear reflections that have minimal interfering compression and vertical shear modes. This allows further data processing steps to proceed in a more robust manner.

Figure 3:
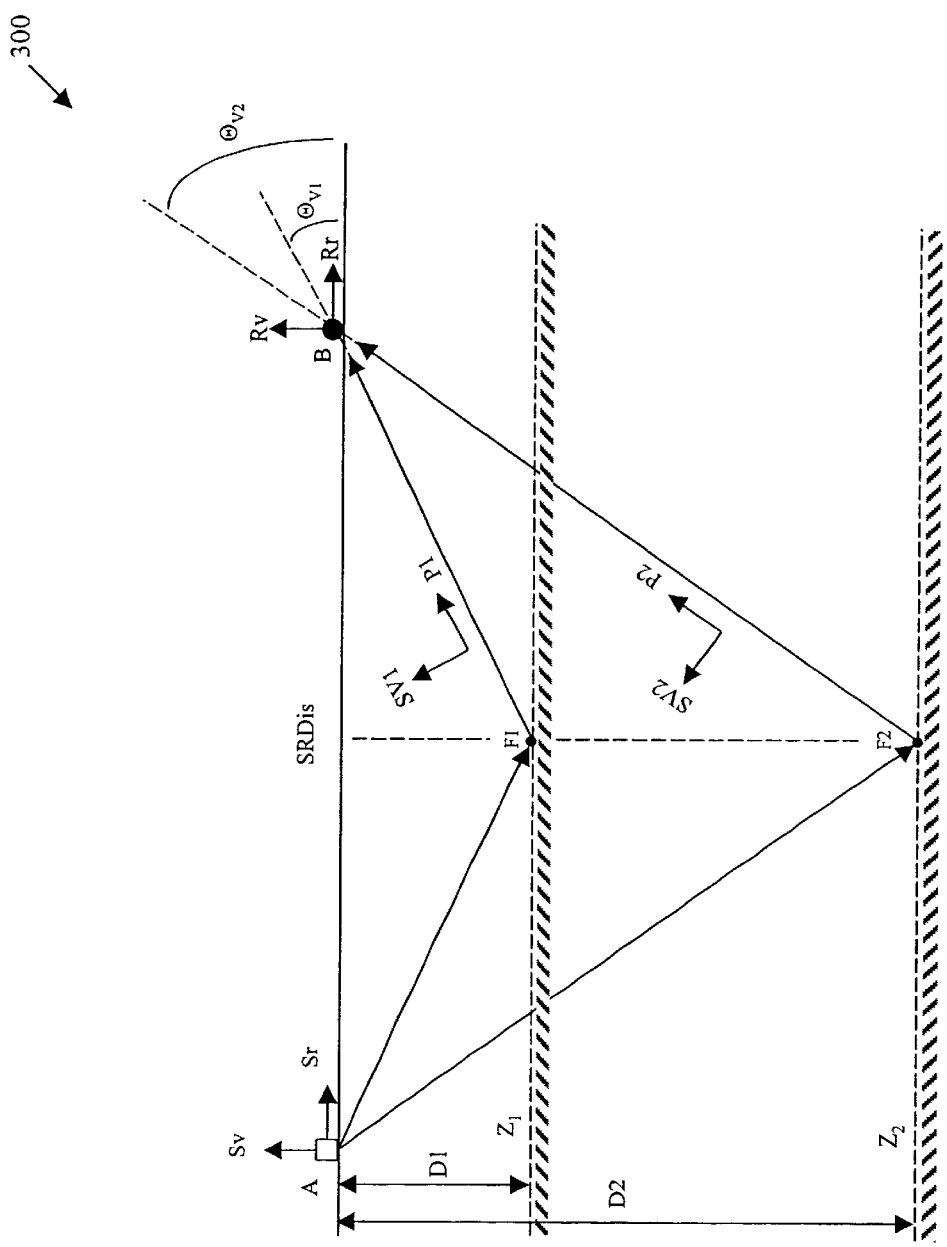
FIG. 3 illustrates a vertically sectioned plane view of an embodiment of a seismic survey system taken along the straight line formed through the source-receiver station pair of FIG. 2.

Turning now to FIG. 3, illustrated is a vertically sectioned plane view of an embodiment of a seismic survey system 300 taken along the straight line formed through the source-receiver station pair A-B of FIG. 2. The seismic survey system 300 includes a surface receiver station B having a radial seismic energy receiver Rr oriented along the path of the source-receiver station pair A-B and a substantially orthogonal vertical seismic energy receiver Rv. Although not specifically detailed in FIG. 3, the receiver station B also includes a transverse seismic energy receiver Rt, as was shown in FIG. 2. The seismic survey system 300 also includes a first subsurface interface $Z_1$ located at a first depth D1 having a first subterranean feature F1 and a second subsurface interface $Z_2$ located at a second depth D2 having a second subterranean feature F2. The embodiment of FIG. 3 displays a radial and vertical coordinate orientation (radial/vertical space).

The seismic survey system 300 further includes a source station A, located on the surface, having a radial seismic energy source Sr, a vertical seismic energy source Sv and a transverse seismic energy source St (not shown), as before. The source station A is located at a source-receiver distance SRDis from the receiver station B. The seismic energy sources located at the source station A generate seismic energy along a first wavepath A-F1-B that provides a first reflected seismic energy wave F1-B and along a second wavepath A-F2-B that provides a second reflected seismic energy wave F2-B, as shown. In the illustrated embodiment, the first and second reflected seismic energy waves F1-B, F2-B have first and second angles of emergence $\Theta_{V1}$, $\Theta_{V2}$, as seen in FIG. 3.

Generally, an angle of emergence may be defined as the angle between a path of a reflected seismic energy wave and a line containing the axis of a radial seismic energy receiver. Both the path of the reflected seismic energy wave F1-B and the axis of the radial seismic energy receiver Rr should also lie within a vertically sectioned plane such as that shown in FIG. 3. Additionally, if the axis of the radial seismic energy receiver Rr is above or below a horizontal line, the first and second angles of emergence $\Theta_{V1}$, $\Theta_{V2}$ will be respectively less than or greater than those shown in FIG. 3.

The first and second reflected seismic energy waves F1-B, F2-B contained in the seismic survey system 300 include essentially orthogonal compression and vertical shear waves. Horizontal shear waves have been made normal to the vertically sectioned view of FIG. 3 by the horizontal rotation achieved in the embodiment of FIG. 2. The first reflected seismic energy wave F1-B includes a first compression wave P1 and a first vertical shear wave SV1. The second reflected seismic energy wave F2-B includes a second compression wave P2 and a second vertical shear wave SV2, as shown. This reflected seismic energy is received by the radial seismic energy receiver Rr and the vertical seismic energy receiver Rv at different first and second angles of emergence $\Theta_{V1}$, $\Theta_{V2}$. This situation provides another intermingled data condition that again typically complicates processing, imaging and interpreting seismic information.

Figure 4:
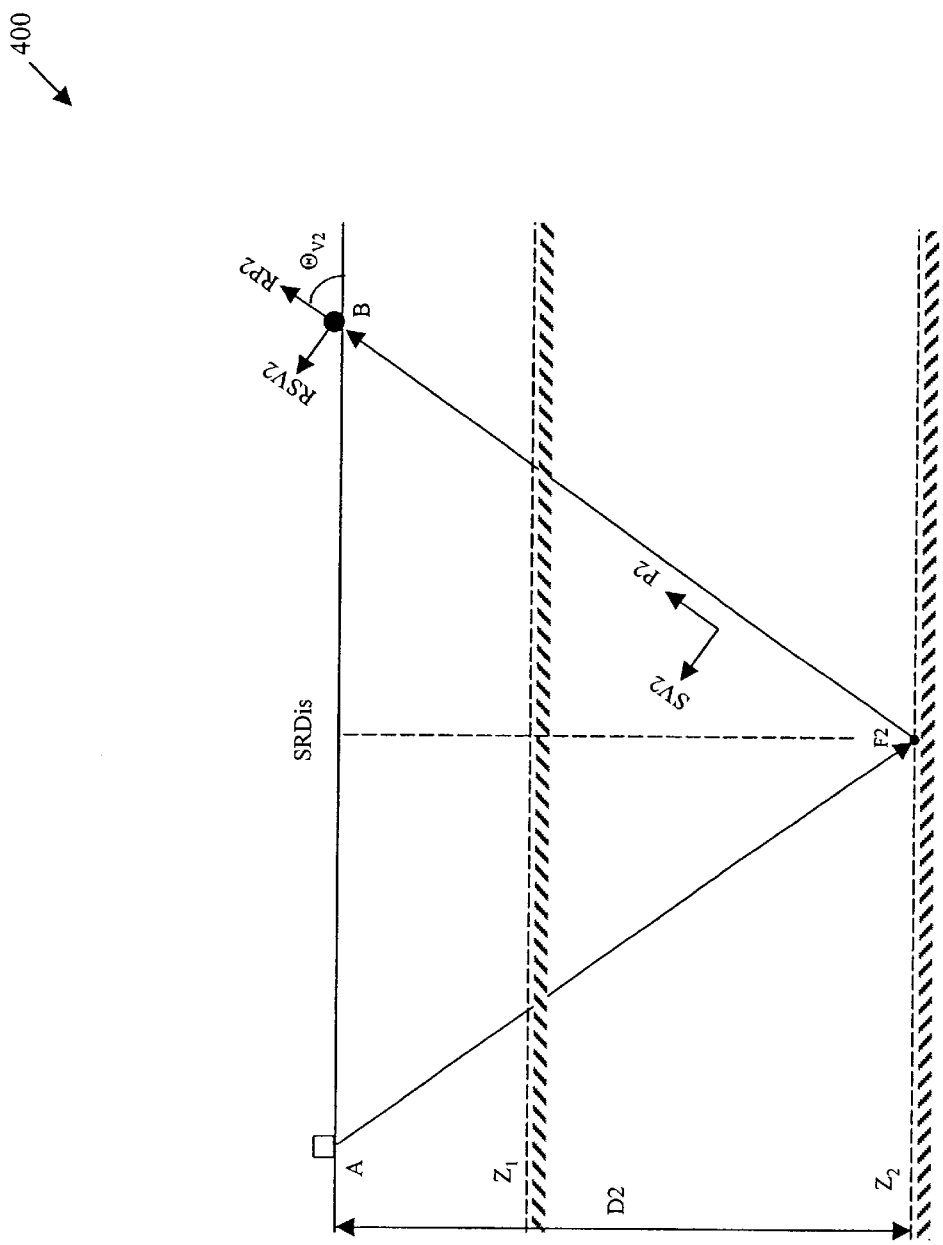
FIG. 4 illustrates a vertically sectioned plane view of an embodiment of a seismic survey system showing a transformation of the seismic survey system of FIG. 3, constructed according to the principles of the present invention.

Turning now to FIG. 4, illustrated is a vertically sectioned plane view of an embodiment of a seismic survey system 400 showing a transformation of the seismic survey system 300 of FIG. 3, constructed according to the principles of the present invention. The vertically sectioned plane view of FIG. 4 is taken along the straight line formed through the source-receiver station pair A-B as was shown in FIG. 3. The various subsurface geometries of FIG. 4 remain the same as in FIG. 3. Alternatively, the transformation shown in the seismic survey system 400 converts the radial and vertical coordinate orientation (radial/vertical space) of FIG. 3 to a compression and vertical shear coordinate orientation (compression/vertical shear space). Correspondingly, this second coordinate change is accomplished by another simple rotation of the receivers shown in FIG. 3.

The seismic survey system 400 includes a first receiver that is a compression seismic energy receiver RP2 and a substantially orthogonal second receiver that is a vertical shear seismic energy receiver RSV2. Both the compression seismic energy receiver RP2 and the vertical shear seismic energy receiver RSV2 have been rotated from the orientation shown in the seismic survey system 300 of FIG. 3 by an amount equal to the second angle of emergence $\Theta_{V2}$, as shown in FIG. 4. Recall that the second angle of emergence $\Theta_{V2}$ is defined as the angle between the second reflected seismic energy wave F2-B and the axis of the radial seismic energy receiver Rr of FIG. 3. In FIG. 4, the second angle of emergence $\Theta_{V2}$ is the angle between the axis of the compression seismic energy receiver RP2 and a horizontal line.

This rotation orients the compression seismic energy receiver RP2 such that it is aligned with the second angle of emergence $\Theta_{V2}$. This coordinate rotation thereby allows the compression seismic energy receiver RP2 to maximize the compressional seismic energy wave received, and the substantially orthogonal vertical shear seismic energy receiver RSV2 to maximize the vertical shear seismic energy wave received. This action thereby substantially separates the compressional wave from the vertical shear wave. Theoretically, an angle of emergence may vary between the extremes of −90° and 90° for physically oriented receivers, although a smaller range is more practically encountered due to field and equipment constraints.

From a practical perspective, the orientation of the first and second receivers to a compression/vertical shear space is more easily achieved by applying an algorithm to the data received. For the embodiment of FIG. 4 where the axis of the compression seismic energy receiver RP2 is horizontal, an algorithm in the form of a simple trigonometric relationship may be applied. Referring to FIG. 4, the second angle of emergence $\Theta_{V2}$ may be defined by:

$$\tan \Theta_{V2} = D2/(SRDis/2), \text{ and}$$

$$\Theta_{V2} = Arctan[D2/(SRDis/2)].$$

For this case, the second angle of emergence $\Theta_{V2}$ may vary from about 0° when the source station A and the receiver station B are widely separated to about 90° when they are in close proximity. Clearly, other methods and algorithms exist for calculating an angle of emergence and are well within the broad scope of the present invention.

As may be seen in FIG. 3, an angle of emergence is a depth-dependent quantity. Therefore, aligning the compression seismic receiver RP2 with the second angle of emergence $\Theta_{V2}$ tends to focus the reflected, time-variant seismic energy, both compressional and vertical shear waves, emanating from the second subterranean feature F2 in the embodiment of FIG. 4. This particular alignment also tends to defocus the reflected, time-variant seismic energy emanating from other subsurface areas such as the first subterranean feature F1 of FIG. 3. Specifically, this capability provides a powerful tool for both separating the compressional and vertical shear waves and focusing an investigation on selected subterranean targets. Generally, this capability also provides a system and method for analyzing and interpreting an investigation of all subsurface characteristics by sweeping through all angles of emergence associated with a set of seismic data.

Figure 5:
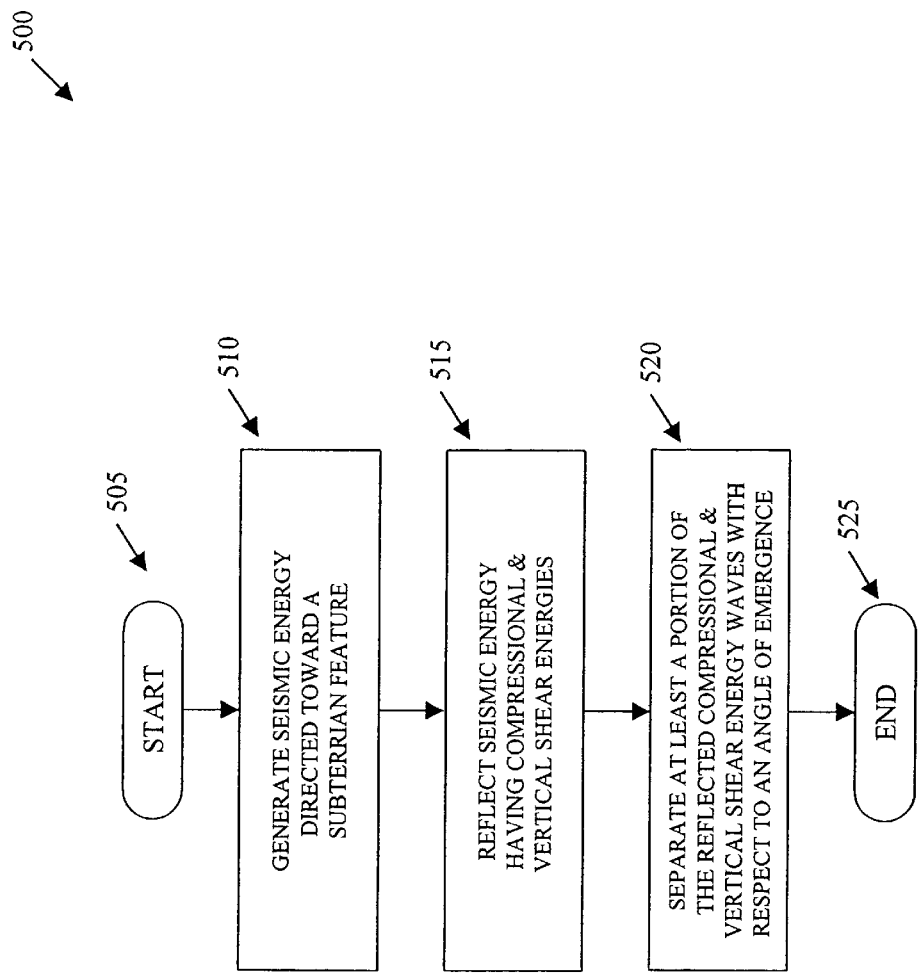
FIG. 5 illustrates a flow diagram showing a method of exploring a subterranean feature with seismic energy constructed according to the principles of the present invention.

Turning now to FIG. 5, illustrated is a flow diagram showing a method 500 of exploring a subterranean feature with seismic energy constructed according to the principles of the present invention. The method 500 starts in a step 505 with an intent to explore a subterranean feature. The step 505 includes supplying first and second seismic energy receivers wherein the second seismic energy receiver is oriented substantially orthogonal to the first seismic energy receiver.

The step 505 also includes containing the orthogonally oriented first and second seismic energy receivers in a vertical plane.

The method 500 continues in a step 510, with a seismic energy wave being generated toward a subterranean feature. Then in a step 515, the seismic energy is reflected from the subterranean feature to produce a reflected seismic energy wave having an associated compressional energy and vertical shear energy. In a step 520, at least a portion of a compressional wave contained in the seismic energy wave is separated from at least a portion of the vertical shear wave contained in the seismic energy wave. The step 520 further includes orienting the first and second seismic energy receivers such that the first seismic energy receiver is aligned with an angle of emergence of the reflected seismic energy wave. The angle of emergence is between 0° and 90°.

Orienting the first and second seismic energy receivers in the step 520 may include physically orienting them. Alternatively, orienting the first and second seismic energy receivers may include applying an algorithm to the seismic data received by them. Applying an algorithm includes converting the seismic data received from a radial coordinate to a compressional coordinate for the first seismic energy receiver. Additionally, applying an algorithm includes converting the seismic data received from a vertical coordinate to a vertical shear coordinate for the second seismic energy receiver. These actions thereby maximize the compressional energy received by the first seismic energy receiver and the vertical shear energy received by the second seismic energy receiver. The method 500 ends in a step 525.

In summary, the present invention provides, in one aspect, a system and method for separating a compressional seismic wave from a vertical shear seismic wave. The separation of vertical shear waves from compressional waves allows the vertical shear waves to be normalized or equalized before additional processing or interpretation is performed. The ability to more clearly distinguish shear wave information from compressional wave information provides a tool that greatly enhances seismic interpretation capability in general and the delineation of subsurface fractures in particular.

Although the present invention has been described in detail, those skilled in the art should understand that they can make various changes, substitutions and alterations herein without departing from the spirit and scope of the invention in its broadest form.

What is claimed is:

1. A method of separating a compressional wave from a vertical shear wave, comprising:
    reflecting a seismic energy from a subsurface interface to produce a reflected seismic energy wave having compressional energy and vertical shear energy associated therewith; and
    orienting first and second seismic energy receivers such that said first seismic energy receiver is aligned with said reflected seismic energy wave having an angle of emergence to thereby maximize said vertical shear energy received by said second seismic energy receiver.

2. The method as recited in claim 1 wherein said first and second energy receivers are orthogonal with respect to each other.

3. The method as recited in claim 1 wherein reflecting includes generating a wave with an energy source and said method further includes receiving said reflected energy wave with said first and second seismic receivers.

4. The method as recited in claim 3 wherein orienting said first and second seismic energy receivers includes orienting said first and second seismic energy receivers in a vertical plane containing said energy source and said first and second seismic energy receivers.

5. The method as recited in claim 1 wherein said angle of emergence is between 0° and 90°.

6. The method as recited in claim 1 wherein orienting said first and second seismic energy receivers includes applying an algorithm to data received by said first and second seismic energy receivers.

7. The method as recited in claim 6 wherein applying an algorithm includes converting data received from a radial coordinate to a compressional coordinate of said first seismic energy receiver and converting data received from a vertical coordinate to a vertical shear coordinate of said second seismic energy receiver.

8. The method as recited in claim 1 wherein orienting said first and second seismic energy receivers includes physically orienting said first and second seismic energy receivers.

9. A system for separating a compressional seismic wave from a vertical shear seismic wave, comprising:
    reflected seismic energy wave reflected from a subsurface interface and having compressional energy and vertical shear energy associated therewith; and
    first and second seismic energy receivers wherein said first seismic energy receiver is aligned with said reflected seismic energy wave having an angle of emergence to thereby maximize said vertical shear energy received by said second seismic energy receiver.

10. The system as recited in claim 9 wherein said first and second energy receivers are orthogonal with respect to each other.

11. The system as recited in claim 9 further including a seismic energy source.

12. The system as recited in claim 11 wherein said first and second seismic energy receivers are oriented in a vertical plane containing said seismic energy source.

13. The system as recited in claim 9 wherein said angle of emergence is between 0° and 90°.

14. The system as recited in claim 9 further including:
    initial data representing said reflected compressional and vertical shear energy; and
    an algorithm that manipulates said initial data to mathematically orient said first receiver with said emergence angle.

15. The system as recited in claim 14 further including a computer configured to use said algorithm to manipulate said initial data to orient said first receiver with said emergence angle.

16. The system as recited in claim 15 further including radial coordinates, compressional coordinates, vertical coordinates and vertical shear coordinates.

17. The system as recited in claim 9 wherein said first seismic energy receiver is physically oriented to receive data along said emergence angle.

18. A method of exploring a subterranean feature with seismic energy, comprising
    generating a seismic energy wave toward a subterranean feature;
    reflecting said seismic energy from said subterranean feature to produce a reflected seismic energy wave having compressional energy and vertical shear energy associated therewith; and
    separating at least a portion of a compressional wave of said seismic energy wave from at least a portion of a vertical shear wave of said seismic energy wave, including:
        orienting first and second seismic energy receivers such that said first seismic energy receiver is aligned with said reflected seismic energy wave having an angle of emergence to thereby maximize said vertical shear energy received by said second seismic energy receiver.

19. The method as recited in claim 18 wherein said first and second energy receivers are orthogonal with respect to each other.

20. The method as recited in claim 18 wherein reflecting includes generating a wave with an energy source and said method further includes receiving said reflected energy wave with said first and second seismic receivers.

21. The method as recited in claim 20 wherein orienting said first and second seismic energy receivers includes orienting said first and second seismic energy receivers in a vertical plane containing said energy source and said first and second seismic energy receivers.

22. The method as recited in claim 18 wherein said angle of emergence is between 0° and 90°.

23. The method as recited in claim 18 wherein orienting said first and second seismic energy receivers includes applying an algorithm to data received by said first and second seismic energy receivers.

24. The method as recited in claim 23 wherein applying an algorithm includes converting data received from a radial coordinate to a compressional coordinate of said first seismic energy receiver and converting data received from a vertical coordinate to a vertical shear coordinate of said second seismic energy receiver.

25. The method as recited in claim 18 wherein orienting said first and second seismic energy receivers includes physically orienting said first and second seismic energy receivers with respect to said emergence angle.

* * * * *